United States Patent [19]

Bryant

[11] 4,446,263

[45] May 1, 1984

[54] UV-STABILIZATION OF OXYMETHYLENE COPOLYMERS

[75] Inventor: Walter R. Bryant, Bishop, Tex.

[73] Assignee: Celanese Corporation, New York, N.Y.

[21] Appl. No.: 453,997

[22] Filed: Dec. 28, 1982

[51] Int. Cl.³ .......................... C08K 5/34; C08K 5/48; C08K 5/13

[52] U.S. Cl. .................................. 524/100; 524/102; 524/291; 524/343; 524/359

[58] Field of Search ................. 524/91, 102, 291, 343, 524/359, 100

[56] References Cited

U.S. PATENT DOCUMENTS 3,219,621 11/1965 Prichard ............................ 524/343
4,342,680 8/1982 Sugio et al. ........................... 524/91

Primary Examiner—John Kight, III
Assistant Examiner—Kriellion Morgan
Attorney, Agent, or Firm—Herbert P. Price

[57] ABSTRACT

An improved molding composition is provided which exhibits desirable weathering resistance and UV stability comprising an oxymethylene copolymer having at least one chain containing from about 85 to 99.6 mole percent of oxymethylene units interspersed with about 0.4 to 15 mole percent of oxyethylene units, about 0.1 to 1 percent by weight of 1,6-hexamethylene bis-(3,5-di-tert-butyl)-4 hydroxy hydrocinnamate, about 0.015 to 0.4 percent by weight of 2,4,6-triamino-symtriazine, about 0.1 to 0.75 percent by weight of bis(1,2,2,6,6-pentamethyl-4-piperidinyl) ((3,5-bis(1,1-dimethylethyl-4-hydroxyphenol)methyl)) butyl propanedioate and about 0.25 to 1.0 percent by weight of 2-hydroxy-4-n-octoxybenzophenone.

7 Claims, No Drawings

UV-STABILIZATION OF OXYMETHYLENE COPOLYMERS

BACKGROUND OF THE PRESENT INVENTION

This invention relates to polymers having good resistance to weathering and ultra-violet degradation. This invention also relates to a method for improving the resistance to weathering and ultra-violet degradation of polymers.

Polyoxymethylene polymers, having recurring —$CH_2O$— units have been known for many years. They may be prepared by the polymerization of trioxane which is a cyclic trimer of formaldehyde. Polyoxymethylene varies in molecular weight, depending on its method of preparation.

High molecular weight solid polyoxymethylenes have been prepared by polymerizing trioxane in the presence of certain fluoride catalysts such as antimony fluoride and may also be prepared in high yields and at rapid reaction rates by the use of catalysts comprising boron fluoride coordination complexes with organic compounds, as described in U.S. Pat. No. 2,989,506 of Hudgin et al. Boron fluoride gas is also a rapid and effective catalyst, as disclosed in U.S. Pat. No. 2,989,507 also of Hudgin et al. A group of oxymethylene polymers containing repeating carbon-to-carbon single bonds in the polymer chain prepared, for example, by copolymerizing trioxane and any of various cyclic ethers such as ethylene oxide or dioxalane is disclosed in U.S. Pat. No. 3,027,352 of Walling et al. Such copolymers may be described as having at least one chain containing from about 85 to about 99.6 mole percent of oxymethylene units interspersed with between about 0.4 and about 15 mole percent of —O—R— units wherein R is a divalent radical containing at least 2 carbon atoms directly linked to each other and positioned in the chain between the two valences, with any substituents on the R radical being inert.

Other methods of preparing oxymethylene polymers are disclosed by Kern et al in Angewandte Chemi 73(6) 177–186 (Mar. 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein etc.

Oxymethylene polymers, when exposed to ultra-violet light for long periods of time, undergo degradation which impairs their toughness and flexibility. Further, the oxymethylene polymers become badly discolored when exposed to heat and ultra-violet light. The resulting brittleness and discoloration are undesirable, particularly in electrical and automotive applications where toughness, flexibility and color retention over prolonged periods of time are required.

It is known that the susceptibility of oxymethylene polymers to weathering without undue decrease in thermal stability can be reduced by the addition of a 2-hydroxy benzophenone to a polyoxymethylene polymer wherein the polymer units are derived from cyclic ethers having at least two adjacent carbon atoms. See in this regard U.S. Pat. No. 3,219,621 of Prichard et al, herein incorporated by reference.

It is desirable, however, to provide a polyoxymethylene molding composition which exhibits highly desirable resistance to weathering and as well as UV stability.

OBJECTS AND SUMMARY OF THE PRESENT INVENTION

It is therefore an object of the present invention to provide a polyoxymethylene molding composition which exhibits desirable resistance to weathering.

It is also an object of the present invention to provide a polyoxymethylene molding composition which exhibits desirable UV stability.

It is further an object of the present invention to provide a polyoxymethylene molding composition which exhibits resistance to thermal, color and surface embrittlement and degradation normally encountered upon exposure for prolonged periods of time to ultraviolet light under ambient conditions.

In accordance with the present invention, there is thus provided a molding composition which exhibits desirable weathering stability comprising, based on the total composition:

(a) an oxymethylene copolymer having a melting point of at least about 150° C. and having at least one chain containing from about 85 to 99.6 mole percent of oxymethylene units interspersed with about 0.4 to 15 mole percent of oxyethylene units;

(b) about 0.1 to 1.0 percent by weight of 1,6-hexamethylene bis-(3,5-di-tert-butyl)-4 hydroxy hydrocinnamate;

(c) about 0.015 to 0.4 percent by weight of 2,4,6-triamino-sym-triazine;

(d) about 0.1 to 0.75 percent by weight of bis(1,2,2,6,6-pentamethyl-4-piperidinyl) ((3,5-bis(1,1-dimethylethyl-4-hydroxyphenol)methyl)) butyl propanedioate; and (e) about 0.25 to 1.0 percent by weight of 2-hydroxy-4-n-octoxy-benzophenone.

DETAILED DESCRIPTION OF THE INVENTION

It has been surprisingly and unexpectedly found that the weathering and ultraviolet light (UV) stability of the polyoxymethylene copolymers of the present invention can be desirably enhanced by the presence of the weathering and UV stabilization additives described in detail below.

A. The Polyoxymethylene Component

A preferred group of polymers intended to be utilized in accordance with this invention are oxymethylene-cyclic ether copolymers having a structure comprising recurring units having formula

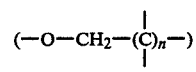

wherein n is an integer from zero to 5 and wherein n is zero in from 60 to 99.6 percent of the recurring units.

A preferred class of copolymers are those having a structure comprising recurring units having the formula (—O—$CH_2$—($CH_2$)$_n$—) wherein n is an integer from zero to 2 and wherein n is zero in from 60 to 99.6 percent of the recurring units. These copolymers are prepared by copolymerizing trioxane with a cyclic ether having the structure

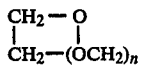

where n is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom. The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone in amounts such that its boron fluoride content is between about 0.0001 and about 1.0 weight percent based on the weight of the monomers in the polymerization zone. Preferably, amounts between about 0.003 and about 0.03 weight percent should be used in a continuous process.

The preferred catalyst used in preparing the oxymethylene copolymer is the aforementioned boron trifluoride as discussed in U.S. Pat. No. 3,027,352 issued to Walling et al, herein incorporated by reference. Reference may be made to this patent for further information concerning the polymerization conditions, amount of catalyst employed, etc.

The monomers in the reaction zone are preferably anhydrous or substantially anhydrous. Small amounts of moisture, such as may be present in commercial grade reactants or may be introduced by contact with atmospheric air, will not prevent polymerization but should be essentially removed for optimum yields.

In a specific embodiment of this invention, the trioxane, cyclic ether and catalyst are dissolved in a common anhydrous solvent, such as cyclohexane and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mole ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and a oxyethylene group. Its incorporation into the copolymer molecule introduces oxyethylene groups into the polymer molecule.

In general, the cyclic ether is present in the reaction mixture in the amounts between about 0.2 and about 30 mole percent, based on the total moles of monomer. The optimum proportion will depend on the particular copolymer desired, the expected degree of conversion and the chemical constitution of the cyclic ether used.

The copolymer produced from the preferred cyclic ethers in accordance with this invention have a structure substantially comprised of oxymethylene and oxyethylene groups in a ratio from about 1000:1 to about 6:1, preferably 250:1 to 1.5:1.

Upon completion of the polymerization reaction, it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Pat. No. 2,989,509 of Hudgin et al. A preferred oxymethylene copolymer is commercially available from the Celanese Plastics and Specialties Company under the designation Celcon ® acetal copolymer.

The oxymethylene copolymers that are employed in the present invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene copolymer component preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in commonly-assigned U.S. Pat. No. 3,219,623 issued to Beradinelli, herein incorporated by reference.

If desired, the oxymethylene copolymer may be end-capped by techniques known to those skilled in the art. A preferred end-capping technique is accomplished by acetylation with acetic anhydride in the presence of sodium acetate catalyst.

B. The Weathering and UV Stabilization Components

It has been surprisingly found that the combination of the weathering and UV stabilization additives employed in the molding composition of the present invention enables highly desirable weathering resistance and UV stabilization properties to be obtained.

Specifically, the composition comprises about 0.1 to 1.0 percent, and preferably 0.2 to 0.5 percent by weight, of 1,6-hexamethylene bis-(3,5-di-tert-butyl)-4-hydroxy hydrocinnamate; about 0.015 to 0.4 percent, and preferably about 0.1 to 0.4 percent by weight, of 2,4,6-triamino-sym-triazine; about 0.1 to 0.75 percent, and preferably 0.15 to 0.35 percent by weight, of bis(1,2,2,6,6-pentamethyl-4-piperidinyl) ((3,5-bis(1,1- dimethylethyl-4-hydroxyphenol)methyl))butyl propanedioate; and about 0.025 to 1.0 percent, and preferably 0.15 to 0.35 percent by weight, of 2-hydroxy-4-n-octoxy-benzophone.

The 1,6-hexamethylene bis-(3,5-di-tert-butyl)-4-hydroxy hydrocinnamate additive serves as an antioxidant and is commercially available from Ciba-Geigy Corporation under the tradename Irganox 259. The bis(1,2,2,6,6-pentamethyl-4-piperidinyl) ((3,5-bis(1,1-dimethylethyl-4-hydroxyphenol)methyl))butyl propanedioate additive serves as a free radical scavenger and is also commercially available from Ciba-Geigy Corporation under the tradename of Tinuvin 144. The 2,4,6-triamino-sym-triazine additive (i.e., melamine) serves as an acid scavenger. Oxymethylene copolyers described herein which incorporate the above three additives have been commercially available as molding compositions from Celanese Corporation since about March, 1981.

The 2-hydroxy-4-n-octoxy-benzophenone additive serves as a UV absorber and is available from American Cyanamid Company under the tradename Cyasorb UV 531. The use of such an additive in oxymethylene molding compositions is described in U.S. Pat. No. 3,219,621. As demonstrated by the following example, the combination of the 2-hydroxy-4-n-octoxy-benzophenone UV absorber together with the three additives identified above provides highly desirable weathering resistance and UV stabilization of the oxymethylene molding compositions of the present invention.

The additives may be mixed with the copolymer by any suitable technique, e.g., by dry-blending in a Henschel mixer followed by melt extrusion and pelletizing; by milling between two heated rolls and chopping into molding granules; or by milling in Banbury mixer or Brabender Plastograph.

Blends of the present invention may include approximately 1 to 60 and preferably approximately 50 to 60 percent by volume, based upon the total weight of the article, of a reinforcing agent. Representative fibers which may serve as reinforcing agents include but are not limited to glass fibers, graphitic carbon fibers, amorphous carbon fibers, synthetic polymeric fibers, aluminum fibers, titanium fibers, steel fibers, tungsten fibers, ceramic fibers, etc.

Representative filler materials may also be employed in amounts ranging from about 1 to 50 percent by weight. Exemplary filler materials include calcium silicate, silica, clays, talc, mica, polytetrafluoroethylene, graphite, alumina trihydrate, sodium aluminum carbonate, barium ferrite, pigments, etc.

The invention is additionally illustrated in connection with the following Examples which are to be considered as illustrative of the present invention. It should be understood, however, that the invention is not limited to the specific details of the Examples.

EXAMPLE

Oxymethylene molding compositions were prepared comprised of a polyacetal molding resin marketed by Celanese Plastics and Specialties Co. under the tradename Celcon®. The compositions included various additives to determine the effect of such additives upon the weathering and UV stability of the molding compositions, with the following additives being employed in various combinations:

(a) Antioxidant 1,6-hexamethylene bis-(3,5-di-tert-butyl)-4 hydroxy hydrocinnamate (Ciba-Geigy Irganox 259)

(b) Acid Scavenger 2,4,6-triamino-sym-triazine (American Cyanamid melamine)

(c) UV Stabilizers n-hexadecyl-1,3,5-di-t-butyl-4-hydroxybenzoate (American Cyanamid Cyasorb UV 2908)

2(2'-hydroxy-3',5'-di-t-amylphenyl)benzotriazole (Ciba-Geigy Tinuvin 328)

2-hydroxy-4-octoxy-benzophenone (American Cyanamid Cyasorb UV 531)

2-(2-hydroxy-5-t-octylphenyl)benzotriazole (American Cyanamid Cyasorb UV 5411)

bis(2,2,6,6-tetramethyl-piperidinyl-4)sebacate (Ciba-Geigy Tinuvin 770)

2(2'-hydroxy-5'-methylphenyl)benzotriazole (Ciba-Geigy Tinuvin P)

bis(1,2,2,6,6-pentamethyl-4-piperidinyl) ((3,5-di-tert-butyl)-4-hydroxybenzyl)butyl propanedioate (Ciba-Geigy Tinuvin 144).

Polyacetal molding compositions were prepared containing certain of the above additives as described in the Tables and extruded at 194° C. and molded at 194° C. to form 2×3 inch color chips and tensile bars. The chips were placed in an Atlas Fadeometer at 92° C. and in a Q.U.V. Accelerated Weathering Tester with four hour condensation cycles for two weeks of ultra-violet light exposure. The condensation cycles allow the water to penetrate the test color chips thereby promoting internal oxidation, blistering, microcracks and surface dulling. The results of the tests are summarized in Table I which demonstrates the results of using the additives in non-pigmented polyacetal resins as well as Table II which demonstrates the results of using the additives in pigmented polyacetal resin (336 hours of exposure). Color differences and yellowness index are based on the Hunterlab color rating system, with color difference indicating total color change while the yellowness index indicates the degree of yellowness subsequent to exposure. Yellowness index is determined according to ASTM (D1925)35. The light and water exposure apparatus is of the fluorescent UV-condensation type and employed according to ASTM G53-77 (QUV) as well as the carbon arc type employed according to ASTM 1499-64 (Atlas Fadeometer)

TABLE I

| Non-Pigmented Polyacetal Weathering Stability | | | |
|---|---|---|---|
| Formulation | Yellowness Index Before Test | Yellowness Index After Test | Visual Evaluation |
| 0.5% Irganox 259 0.25% Melamine | 2.74 | 16.89 | Total surface deterioration heavy chalking and microcracks after 100 hours of exposure |
| 0.5% Irganox 259 0.25% Melamine 0.35% Tinuvin P | 3.65 | 11.60 | Heavy yellowing |
| 0.5% Irganox 259 0.25% Melamine 0.35% Cyasorb UV 5411 | 4.85 | 12.80 | Heavy yellowing |
| 0.5% Irganox 259 0.25% Melamine 0.35% Tinuvin 770 | 3.03 | 9.60 | Heavy yellowing |
| 0.5% Irganox 259 0.25% Melamine 0.35% Cyasorb UV 531 | 3.59 | 6.68 | Very slight surface deterioration |

TABLE I-continued

Non-Pigmented Polyacetal Weathering Stability

| Formulation | Yellowness Index Before Test | Yellowness Index After Test | Visual Evaluation |
|---|---|---|---|
| 0.15% Tinuvin 144 | | | |

The above data demonstrates that the combination of the Cyasorb UV 351 and Tinuvin 144 additives provides highly desirable protection against yellowness in non-pigmented polyacetal resins.

TABLE II

Pigmented Polyacetal Weathering Stability

| Formulation | Color | Total Color Difference | Visual Evaluation |
|---|---|---|---|
| 0.5% Irganox 259<br>0.25% Melamine | Oyster White | 7.73 | Color Washout |
| 0.5% Irganox 259<br>0.25% Melamine | Charcoal Blue | 9.92 | Heavy Microcracking |
| 0.5% Irganox 259<br>0.25% Melamine<br>0.35% Cyasorb UV 531 | Oyster White | 0.55 | No surface deterioration |
| 0.15% Tinuvin 144<br>0.5% Irganox 259<br>0.25% Melamine<br>0.35% Cyasorb UV 531<br>0.15% Tinuvin 144 | Charcoal Blue | 0.63 | No surface deterioration |

The above tests demonstrates that the addition of the Cyasorb UV 531 nd Tinuvin 144 stabilizers to the polyacetal molding composition enables a composition to be provided which exhibits highly desirable weathering stability with respect to the retention of the color of the molding composition.

Additional tests were carried out with additional formulations to determine the stability of molding compositions by use of the QUV Accelerated Weathering Tester with four hour condensate cycles and the Atlas Fadeometer, with the results being set forth in Table III below:

TABLE III

Pigmented and Non-Pigmented Polyacetal Weathering Stability

| Formulation | Color | Total Color Difference QUV Test | Fadeometer | Visual Evaluation |
|---|---|---|---|---|
| 0.5% Irganox 259<br>0.25% Melamine<br>0.25% Tinuvin 144 | Oyster White<br><br>Charcoal Blue | 1.27<br><br>1.89 | 1.07<br><br>1.45 | Total color and surface breakdown for charcoal blue |
| 0.5% Irganox 259<br>0.25% Melamine<br>0.25% Tinuvin 328<br>0.25% Tinuvin 144 | Oyster White<br><br>Charcoal Blue | 1.75<br><br>2.10 | 0.75<br><br>1.60 | Color breakdown in both colors in QUV test. Color breakdown in blue in Fadeometer test |
| 0.1% Irganox 259<br>0.4% Melamine<br>0.35% Cyasorb UV 531<br>0.15% Cyasorb UV 2908 | Oyster White<br><br>Charcoal Blue | 0.55<br><br>1.03 | 0.73<br><br>0.63 | Acceptable color stability |
| 0.1% Irganox 295<br>0.4% Melamine<br>0.35% Cyasorb UV 531<br>0.15% Tinuvin 144 | Oyster White<br><br>Charcoal Blue | 0.88<br><br>0.83 | 0.89<br><br>1.08 | Acceptable color stability |
| 0.5% Irganox 259<br>0.25% Melamine<br>0.35% Cyasorb UV 531<br>0.15% Tinuvin 144 | Oyster White<br><br>Charcoal Blue | 1.05<br><br>1.00 | 0.95<br><br>0.90 | Acceptable color stability |

The data in Table III demonstrates that the combination of the Cyasorb UV 531 and Tinuvin 144 additives provides highly desirable color stability in polyacetal molding compositions in comparison to the use of other types of stabilizers.

Further tests were undertaken to determine the ability of molding compositions prepared according to the present invention to retain initial elongation at break properties subsequent to 1000 hours of weathering exposure (using both QUV and Atlas Fadeometer tests). The molding composition is pigmented by the addition of carbon black in the amounts noted. The results of the tests are summarized in Table IV below:

TABLE IV

Elongation at Break After Weathering Exposure

| Formulation | Initial Elonqation | QUV | % Retention | Atlas Fadeometer | % Retention |
|---|---|---|---|---|---|
| 0.5% Carbon black<br>0.5% Irganox 259<br>0.25% Melamine<br>0.35% Cyasorb UV 531<br>0.15% Tinuvin 144 | 56 | 42 | 75.0 | 37 | 66.1 |
| 2.0% Carbon black<br>0.5% Irganox 259<br>0.25% Melamine<br>0.35% Cyasorb UV 531<br>0.15% Tinuvin 144 | 40 | 34 | 85.0 | 27 | 67.5 |

The above data demonstrates that molding compositions produced according to the present invention exhibit highly satisfactory retention of elongation properties subsequent to weathering exposure.

The compositions identified in Table IV were also examined to determine their resistance to changes in color, with the results being set forth in Table V below:

TABLE V

| | Color Stability After Weathering Exposure | | | |
| | QUV Test | | Atlas Fadeometer | |
| Formulation | Total Color Difference | Surface Appearance | Total Color Difference | Surface Appearance |
| --- | --- | --- | --- | --- |
| 0.5% Carbon black 0.5% Irganox 259 0.25% Melamine 0.35% Cyasorb UV 531 0.15% Tinuvin 144 | 1.50 | Moderate chalking | 0.38 | Slight microcracking |
| 2.0% Carbon black 0.5% Irganox 259 0.25% Melamine 0.35% Cyasorb UV 531 0.15% Tinuvin 144 | 0.12 | Very slight chalking | 0.06 | No surface deterioration |

The above data demonstrates that the molding compositions of the present invention exhibit acceptable color retention and surface appearance subsequent to weathering exposure.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A molding composition which exhibits desirable weathering stability comprising, based on the total composition:
    (a) an oxymethylene copolymer having a melting point of at least about 150° C. and having at least one chain containing from about 85 to 99.6 mole percent of oxymethylene units interspersed with about 0.4 to 15 mole percent of oxyethylene units;
    (b) about 0.1 to 1.0 percent by weight of 1,6-hexamethylene bis-(3,5-di-tert-butyl)-4 hydroxy hydrocinnamate;
    (c) about 0.015 to 0.4 percent by weight of 2,4,6-triamino-sym-triazine;
    (d) about 0.1 to 0.75 percent by weight of bis(1,2,2,6,6-pentamethyl-4-piperidinyl) ((3,5-bis(1,1-dimethylethyl-4-hydroxyphenol)methyl)) butyl propanedioate; and
    (e) about 0.25 to 1.0 percent by weight of 2-hydroxy-4-n-octoxy-benzophenone.

2. The composition of claim 1 wherein said component (b) is present in an amount of about 0.2 to 0.5 percent by weight.

3. The composition of claim 1 wherein said component (c) is present in an amount of about 0.1 to 0.4 percent by weight.

4. The composition of claim 1 wherein said component (d) is present in an amount of about 0.15 to 0.35 percent by weight.

5. The composition of claim 1 wherein said component (e) is present in an amount of about 0.15 to 0.35 percent by weight.

6. The composition of claim 1 further comprising a filler.

7. The composition of claim 1 further comprising a reinforcing agent.

* * * * *